(12) United States Patent
Hodges et al.

(10) Patent No.: US 6,652,757 B2
(45) Date of Patent: Nov. 25, 2003

(54) METHOD FOR HIGH SPEED DEWATERING OF SLURRIES

(75) Inventors: Michael K. Hodges, Colorado Springs, CO (US); Larry D. Campbell, Harrah, OK (US)

(73) Assignee: Black & Veatch Holding Company, Overland Park, KS (US)

( * ) Notice: Subject to any disclaimer, the term of this patent is extended or adjusted under 35 U.S.C. 154(b) by 0 days.

(21) Appl. No.: 09/849,649

(22) Filed: May 4, 2001

(65) Prior Publication Data

US 2001/0042721 A1 Nov. 22, 2001

(30) Foreign Application Priority Data

May 5, 2000 (GB) .............................................. 0010986

(51) Int. Cl.[7] .................................................. C02F 1/52
(52) U.S. Cl. ....................... 210/709; 210/713; 210/710; 210/738; 210/768; 210/806; 209/5
(58) Field of Search ................................ 210/709, 710, 210/713, 725, 727, 728, 738, 747, 768, 806, 456, 499; 209/5

(56) References Cited

U.S. PATENT DOCUMENTS

| | | | |
|---|---|---|---|
| 4,226,714 A | * 10/1980 | Furness et al. | 210/723 |
| 4,273,658 A | 6/1981 | Karman | 210/709 |
| 4,413,531 A | 11/1983 | Karplus et al. | 73/861.25 |
| 4,438,652 A | * 3/1984 | Saito | 73/861.25 |
| 4,439,325 A | * 3/1984 | Blais | 210/740 |
| 4,470,294 A | * 9/1984 | Hamel | 73/32 A |
| 4,612,123 A | 9/1986 | Eustoacchio et al. | 210/709 |
| 5,616,831 A | 4/1997 | Ferland et al. | 73/61.63 |
| 5,656,174 A | 8/1997 | Hodges et al. | 210/705 |
| 5,846,433 A | 12/1998 | Sorensen et al. | 210/709 |
| 5,902,487 A | * 5/1999 | Pickering et al. | 210/709 |
| 5,938,936 A | 8/1999 | Hodges et al. | 210/705 |

FOREIGN PATENT DOCUMENTS

| | | |
|---|---|---|
| DE | 4442418 | 5/1996 |
| EP | 0172649 A2 | 2/1985 |
| EP | 0151747 | 8/1985 |
| JP | 05269309 | 10/1993 |
| WO | PCT/EP/84/00398 | 7/1985 |
| WO | PCT/IB96/01505 | 6/1997 |
| WO | PCT/ZA99/00079 | 3/2000 |
| WO | W00/69780 | 11/2000 |

OTHER PUBLICATIONS

B. J. Scheiner, et al., "A Comparison of Polyethylene Oxide and Polyacrylamides," Flocculation in Biotechnology and Separation Systems, 1987, pp. 175–185.

(List continued on next page.)

Primary Examiner—Peter A. Hruskoci
(74) Attorney, Agent, or Firm—Marcia J. Rodgers; Shughart Thomson & Kilroy P.C.

(57) ABSTRACT

A system and method for dewatering a continuous stream of slurry at high flow rates demonstrates enhanced efficiency, economy and ease of operation. A stream of slurry is subject to continuous or continual measurement of flow rate and pulp density and the measurements are used to control the rate of addition of a flocculating agent to the slurry. The flocculated slurry is delivered to a dewatering unit where it is passed through a diffuser and evenly delivered to a tracking screen for filtering solids from a liquid filtrate. The pulp density of the filtrate may also be measured and used to control addition of a flocculating agent. The tracking screen is adjusted to achieve an angle of repose suited to the particular composition of the filter cake. The diffuser has a base having a horizontal section aspect ratio of from about 1:1 to about 4:1 and continuously changing vertically into an upper portion having a horizontal section with an aspect ratio of from about 40:1 to about 100:1. The ratio of the horizontal sectional areas at the upper portion with respect to the base is from about 1:1 to about 3:1. The dewatering unit of the invention may be adjustably mounted on a transport means for deployment of the high speed dewatering system and method at any convenient location.

13 Claims, 5 Drawing Sheets

OTHER PUBLICATIONS

B. J. Scheiner, "New Dewatering Technique for Fine Particle Waste," International Mineral Congress, 1988, pp. 1951–1961.

B. J. Scheiner, "Increasing Dewatering Efficiency Through Optimization of the Flocculation Sequence," The American Filtration Society, 1988.

B.J. Scheiner, "Dewatering," Bureau of Mines, U.S. Department of Interior, *Mining Engineering*, Tuscaloosa, Alabama, May 1989.

Sandeep K. Sharma et al., "Factors Affecting the Dewatering of Mineral Slurries," American Filtration Society, Sep., 1990, pp. 120–127.

Sandeep K. Sharma, et al., "Effects of Effect of Physico–Chemical Parameters On Dewatering: A Case Study." Fluid/Particle Separation Journal. Tuscaloosa, Alabama, vol. 4, No. 3, Sep., 1991, pp. 162–166.

J.B. Peterson, et al., "Low Cost Dewatering of Waste Slurries," U.S. Bureau of Mines, Tuscaloosa, Alabama, University of Alabama Campus, pp. 121–126.

Sandeep K. Sharma, et al, "Advances in Filtration and Separation Technology," vol. 3, U.S. Bureau of Mines, Tuscaloosa Research Center, University of Alabama, Tuscaloosa, Alabama.

* cited by examiner

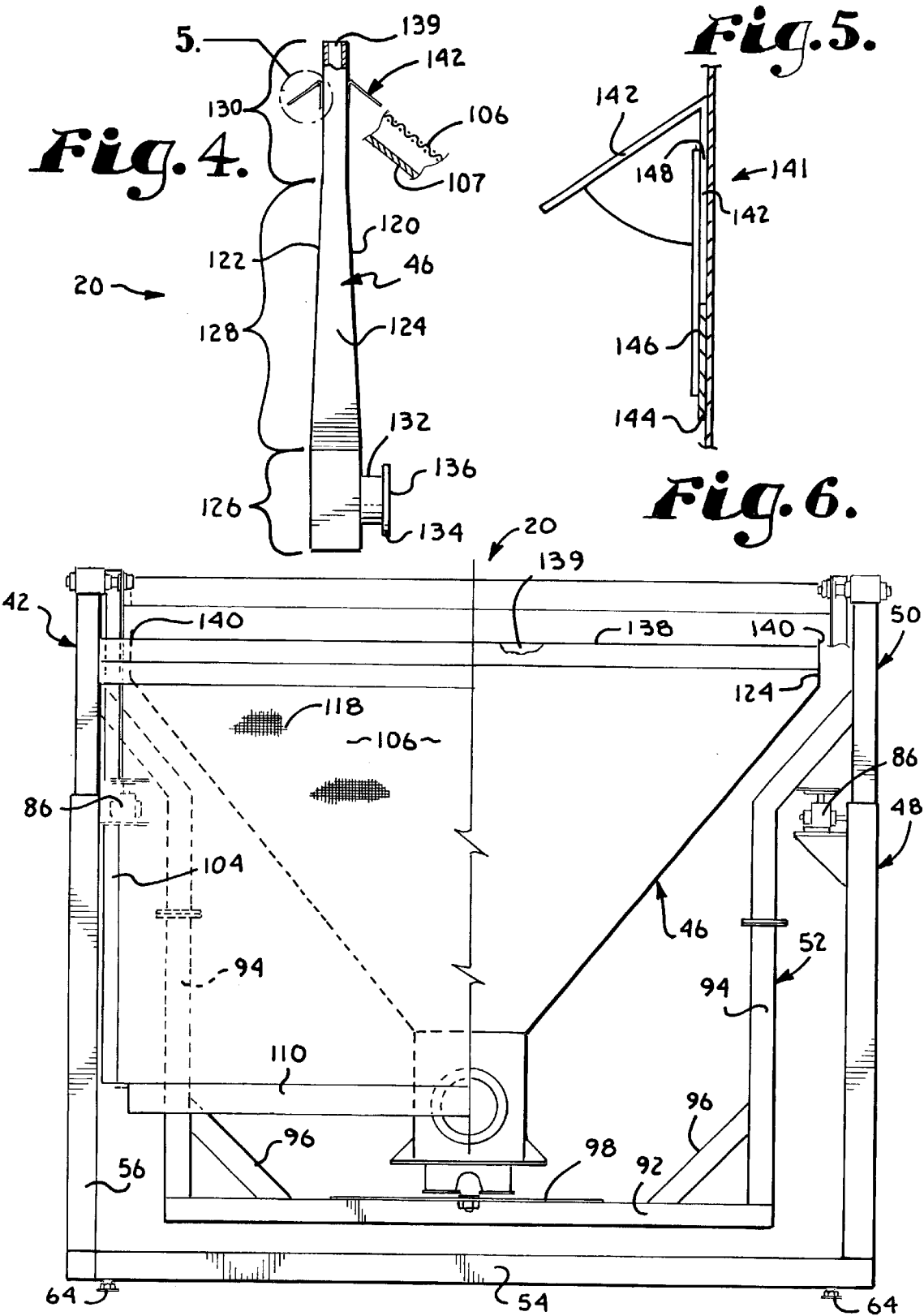

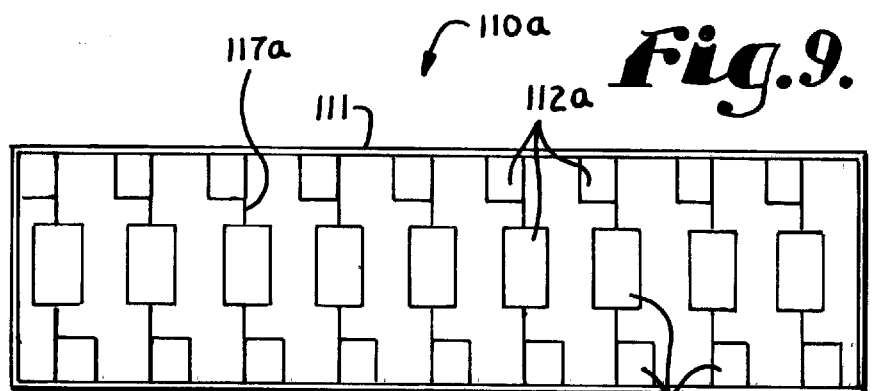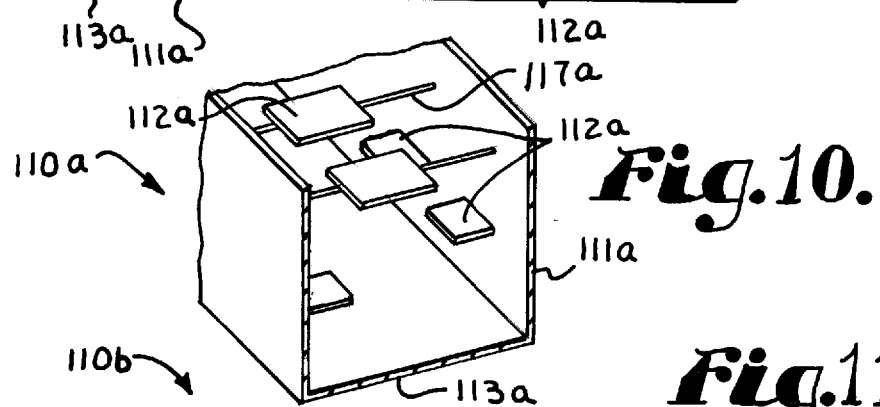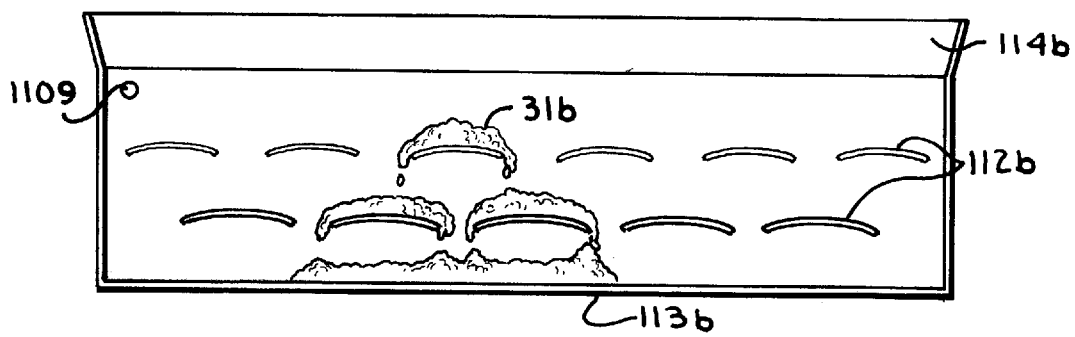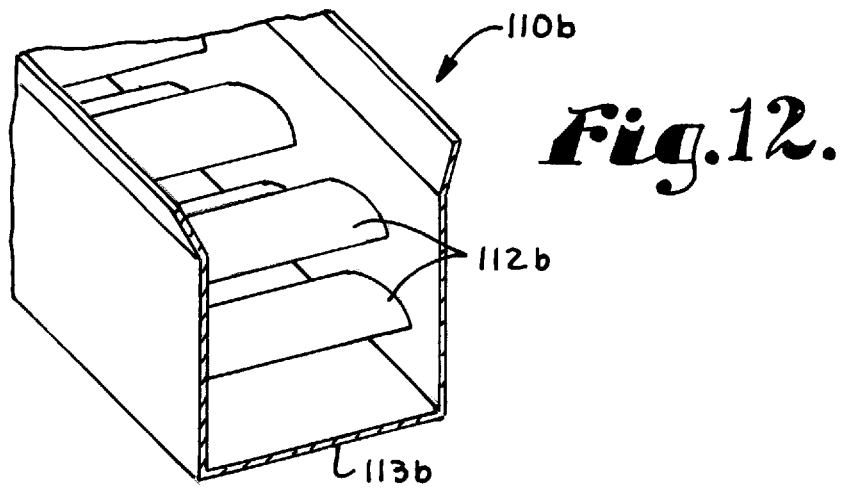

METHOD FOR HIGH SPEED DEWATERING OF SLURRIES

This application claims priority under 35 U.S.C. §119 (a) based on British Patent Application Serial No. 0010986.8 filed May 5, 2000 and entitled HIGH SPEED DEWATERING OF SLURRIES.

BACKGROUND OF THE INVENTION

1. Field of the Invention

The present invention relates to improvements in techniques for dewatering of slurries, particularly slurries resulting from "dredge spoils".

2. Description of the Related Art

Dredge spoil disposal presents a significant problem for dredging contractors. The dredged sludge is suspended in water in the form of a slurry. Such slurries may create serious recovery problems if discharged directly into holding lagoons or settling basins. Accordingly, there is a need to efficiently dewater and reclaim the solid materials from these slurries.

Hydraulic dredges are effective excavation devices for removal of a wide variety of sediments from natural or man-made waterways. The dredges may remove sediments which are classified as contaminated or hazardous sediments as well as non-hazardous sediments. The sediments may comprise debris such as sand, gravel, clays, silts, organic matter, or any combination thereof. Typically, the finest fraction of solids, including clays, silts, and organic matter, contributes the greatest volume and this fraction is also the most difficult to recover. All of the materials excavated from a waterway in the hydraulic dredging process must be removed to a disposal site. Traditionally, these sites include settling basins specifically engineered to accommodate the slow settling characteristics of the finest of the particulate matter. These "sludge lagoons" burden the immediate community in various ways. They occupy significant areas of land and are generally unpleasant neighbors because of the noxious odors emitted during the slow process of drying out the hydrated sediments.

In an attempt to solve the problems associated with such traditional settling basins, dredge slurry dewatering systems were introduced. These dewatering systems are used to separate dredge solids from water so that the solids may be recycled or disposed. The systems typically comprise screening assemblies, hydrocyclones, centrifuges, belt presses and clarifying vessels. Most of these systems operate as "batch treatment" processes, which can accept only defined quantities of dredge spoil at spaced intervals. The dredge spoil is first pumped into a holding vessel, then, while the dredge sits idle, the slurry is slowly pumped and treated by each apparatus in turn, until the holding vessel can be refilled. The processing rates of the individual equipment components of the dewatering system thus limit the throughput rate of the dredging operation. The inefficiencies associated with such batch systems serve to raise the costs of operation.

U.S. Pat. No. 5,656,174 describes a dewatering system that is capable of continuous operation. The system employs a series of filtration screens, and optional further separating devices such as hydrocyclones, followed by addition of a flocculating agent to aggregate the fine solids. The flocculated material is then filtered by passage over a tracking screen assembly having two screens supported on an A-shaped frame. Although relatively high system throughputs (e.g. 1200 US gallons per minute [gal/min] [0.073 $m^3 s^{-1}$]) can be achieved, the described system has a number of shortcomings. There is no means for adjusting the addition of the flocculating agent in response to variations in either the flow rate or the pulp density of the slurry. Thus, an optimal quantity of flocculating agent might not be consistently added. As the flocculated material is added to the A-shaped tracking screens, local settling of the floccules may occur, creating "mud banks" within the apparatus. Such mud banks result in uneven delivery of material to the screen, with consequent inefficient usage of the full surface area. In extreme cases, clogging may cause the screens to become inoperative.

SUMMARY OF THE INVENTION

The present invention provides a system and method for dewatering a continuous stream of slurry at high flow rates, with enhanced efficiency, economy and ease of operation. A stream of slurry is subject to continuous or continual measurement of flow rate and pulp density and the measurements are used to control the rate of addition of a flocculating agent to the slurry. The flocculated slurry is delivered to a dewatering unit where it is passed through a diffuser which evenly delivers it to a tracking screen for filtering solids from a liquid filtrate. The pulp density of the filtrate may also be measured and used to control addition of a flocculating agent. The tracking screen is adjusted to achieve an angle of repose suitable for the composition of the filter cake. The diffuser has a base having a horizontal section aspect ratio of from about 1:1 to about 4:1 and continuously changing vertically into an upper portion having a horizontal section with an aspect ratio of from about 40:1 to about 100:1. The ratio of the horizontal sectional areas at the upper portion with respect to the base is from about 1:1 to about 3:1. The dewatering unit of the invention may be adjustably mounted on a transport means for deployment of the high speed dewatering system and method at any convenient location.

BRIEF DESCRIPTION OF THE DRAWINGS

FIG. 4 is an enlarged side elevational view of a diffuser unit.

FIG. 5 is an enlargement of the detail shown in FIG. 4, showing the weir plate assembly.

FIG. 6 is an enlarged front elevational view of a rapid dewatering unit with parts broken away to show the tracking screen and diffuser assembly.

FIG. 9 is an enlarged diagrammatic top plan view of a first alternate embodiment of a gutter.

FIG. 10 is a perspective sectional view of the gutter shown in FIG. 9.

FIG. 11 is an enlarged diagrammatic side view of a second alternate embodiment of a gutter, with one wall removed to show curved plates with accumulated floccules.

FIG. 12 is a perspective sectional view of the gutter shown in FIG. 11.

DETAILED DESCRIPTION OF THE INVENTION

Figure 8:
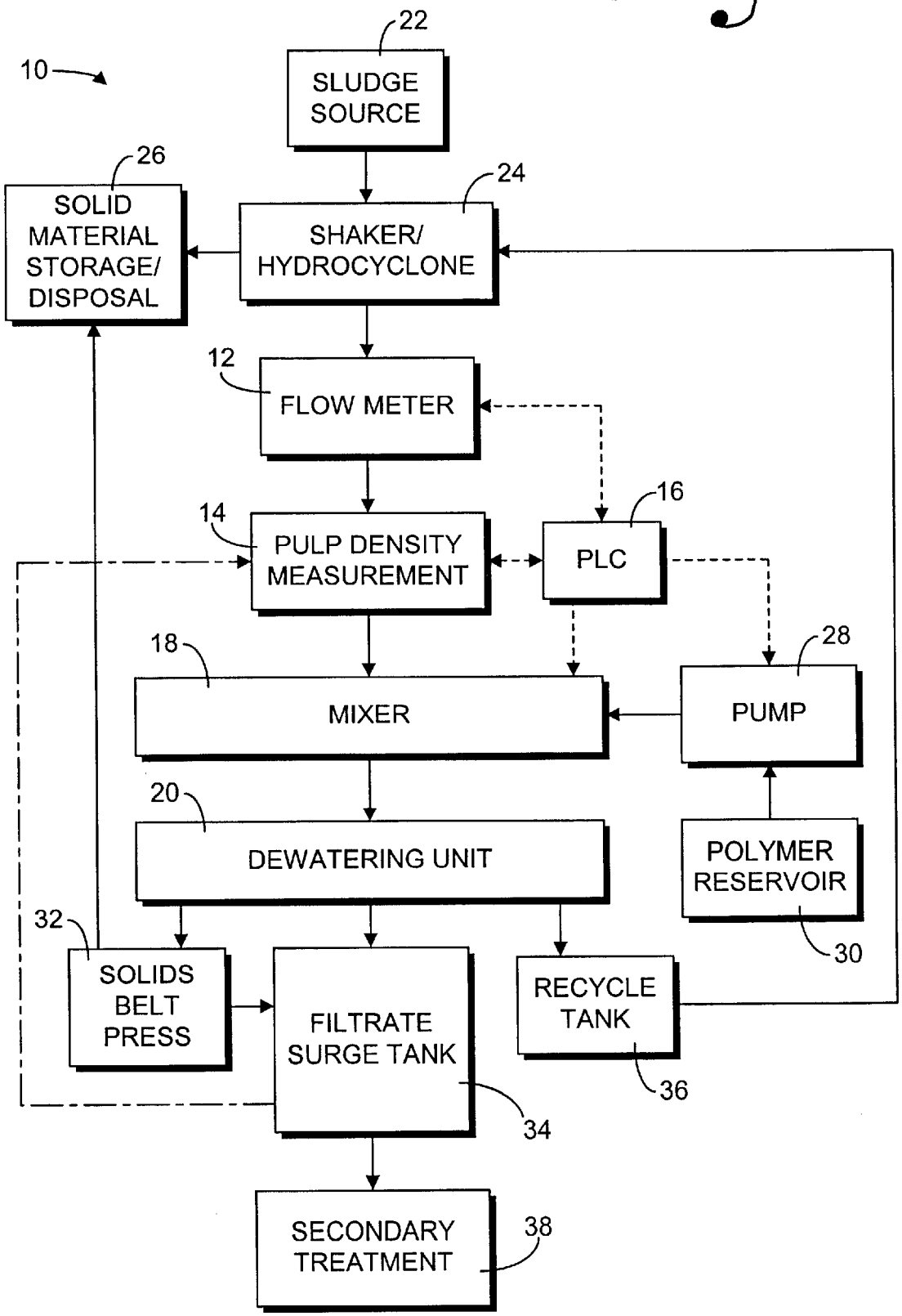
FIG. 8 is a diagrammatic representation showing steps of a method of dewatering a sludge slurry in accordance with the invention.

As best shown in the diagrammatic representation of FIG. 8, a high speed dewatering system and method 10 in accordance with the invention includes a flow meter 12, a pulp density measurement device 14, programmable logic controller 16, a mixer 18 and a rapid dewatering unit 20.

In more detail, the system 10 of the invention is shown in communication with a source of sludge 22 to be dewatered. The system 10 is depicted to include a shaker and/or hydrocyclone device 24 for removal of coarse and/or high density debris, and a solid material storage or disposal unit 26. A programmable logic controller 16 is operably coupled with a pump 28 which communicates with a polymer reservoir 30 for delivery of a polymer flocculant from the reservoir 30 to the slurry stream, either in line prior to, or following entry of the stream into a mixer 18. The mixer 18 discharges the flocculated slurry into the dewatering unit 20. The dewatering unit 20 discharges filter cake floccules 31 to a solids belt press 32, filtrate to a surge tank 34 and improperly flocculated material to a recycle tank 36. Such material may be delivered from the recycle tank 36 to the shaker/hydrocyclone 24 and then through the entire system 10 again. The output of the filtrate surge tank 34 may be recycled to the shaker/hydrocyclone 24, or to a secondary treatment unit 38.

Figure 1:
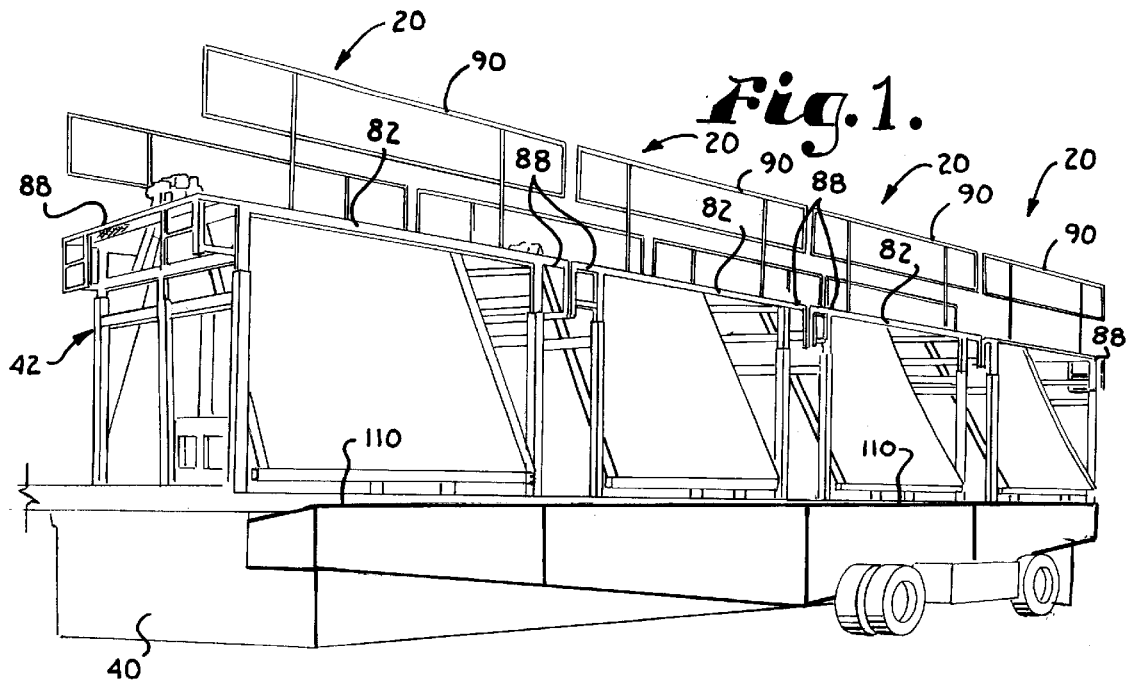
FIG. 1 is a perspective view of dewatering units in accordance with the present invention, shown mounted on a trailer.

The rapid dewatering unit 20 is shown in FIG. 1 mounted on a flatbed trailer 40 for transport by road. The invention may also be embodied in connection with any other suitable means of transport, such as a barge or railroad car, or it may be embodied in a permanent installation. The dewatering unit 20 broadly includes a support structure or framework 42, supporting a tracking screen assembly 44 (FIG. 7) and diffuser assembly or riser 46 (FIGS. 4 and 6).

Figure 7:
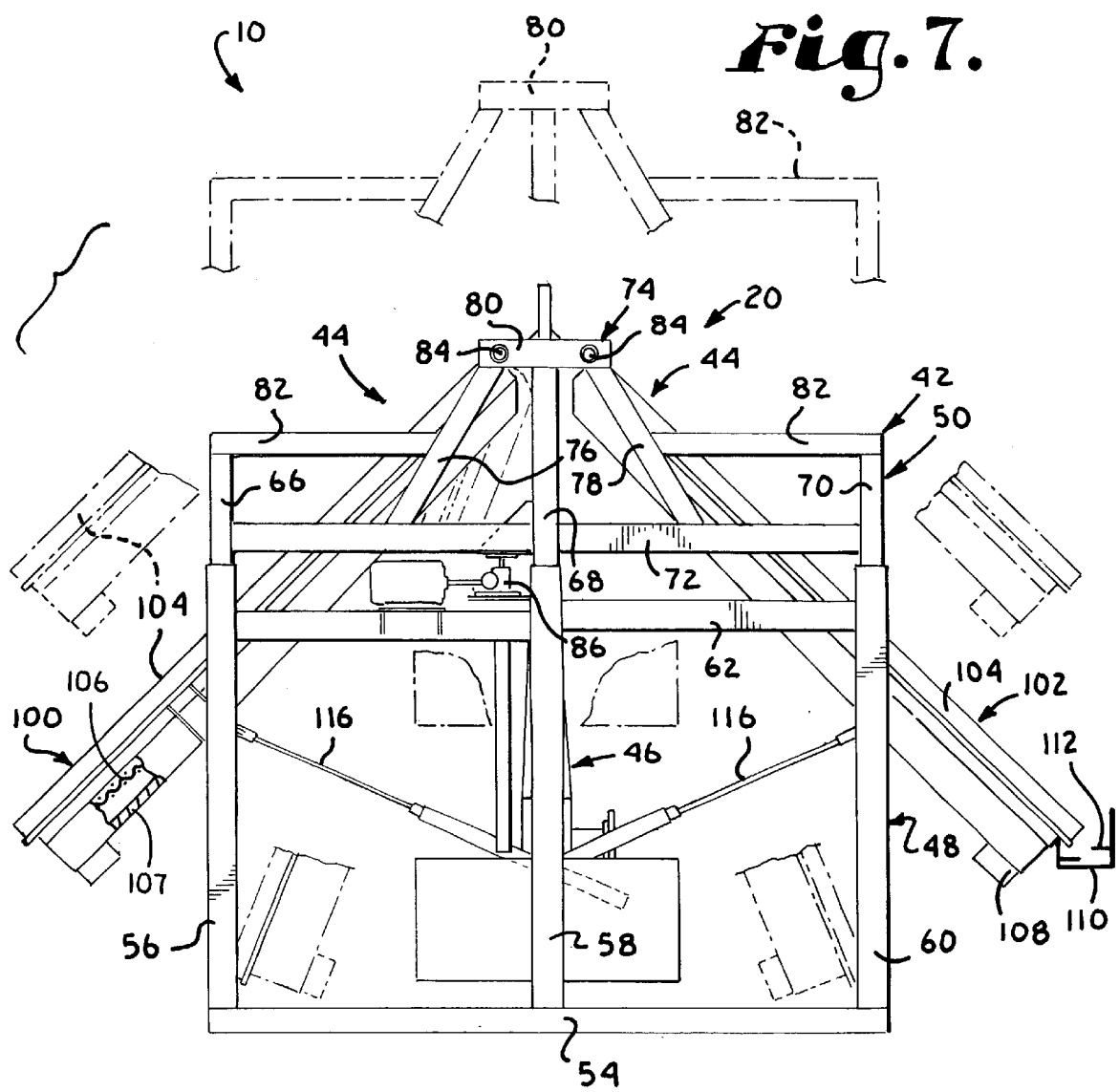
FIG. 7 is an enlarged side elevational view of a dewatering unit showing the tracking screen assemblies in a use position, with alternate use and transport positions shown in phantom.

The framework 42 is best shown in FIGS. 1, 6 and 7 to include a lower frame 48 in telescoping registry with an upper frame 50, and a diffuser frame 52. The lower frame 48 is constructed in two mirror image halves, each including an elongated horizontal base member 54, transversely coupled with a set of spaced back, center and front vertical upright support members, 56, 58 and 60 (FIG. 7). The uprights 56, 58 and 60 are constructed of equal lengths of a suitable material such as square tubular steel. A cross brace 62 transversely intercouples each set of upright support members 56, 58, and 60 in spaced relation to their uppermost ends. Fasteners 64 are provided for coupling the base members 54 to a horizontal support surface such as the bed of a trailer 40.

The upper frame 50 includes matching opposed sets of back, center and front vertical support members 66, 68 and 70, transversely coupled with a cross brace 72. The support members 66, 68 and 70 are also of square tubular construction and are sized to be received within the corresponding tubular upright supports 56, 58 and 60 of the lower frame 48. An upstanding A-frame 74 is centered on the cross brace 72 of each upper frame 50, and includes a pair of legs 76 and 78 surmounted by a header 80. The center support member 68 is elongated for coupling with the A-frame header 80. A header 82 surmounts the back and front uprights 66 and 70 of the upper frame 50 and is angularly coupled with the sides of the A-frame legs 76 and 78, to form a square-shaped top plan view.

The A-frame header 80 includes a pair of spaced hinges 84 for mounting a pair of tracking screen assemblies 44. As best shown in FIG. 6, the lower frame 48 includes a pair of opposed screw-type jacks 86 for urging the upper frame 50 from a lowered transport/storage position to an elevated operating position shown in FIG. 7, a vertical travel distance of about 3 feet.

As shown in FIG. 1, multiple dewatering units 20 may be employed in a dewatering system 10, each having a support structure 42 supporting a tracking screen assembly 44 and diffuser 46. In such systems 10, the headers 82 of the support structure 42 may be extended and appropriately braced to form a walkway 88 at opposed ends of each system unit 20. Companion guard rails 90 may be mounted along opposed sides of the headers 82.

As shown in FIG. 6, the diffuser support frame 52 includes a lower base member 92 transversely intercoupling a pair of vertical support members 94. The upper portions of the vertical supports 94 are angled outwardly in mirror images for coupling with the upper support structure frame 50 to impart an overall dog-leg configuration. A pair of angle braces 96 intercouple the lower portions of the vertical support members 94 with the diffuser frame base 92. A generally planar base plate 98 is centered on the base 92. The base plate is preferably constructed of ½" steel.

The tracking screen assembly 44 preferably comprises back and front screen assemblies 100 and 102 coupled in supporting relationship with the A-frame hinges 84. Such tracking screens are described in detail in U.S. Pat. No. 5,656,174 which is incorporated herein by reference. Each tracking screen assembly 44 includes an open square frame 104 supporting a generally planar screen 106 over a rear drip pan 107. A drain 108 is coupled with each lower corner of the drip pan 107 (one is shown in FIG. 7) to receive a chute (not shown) for carrying the filtrate to the surge tank 34 (FIG. 8).

Figure 2:
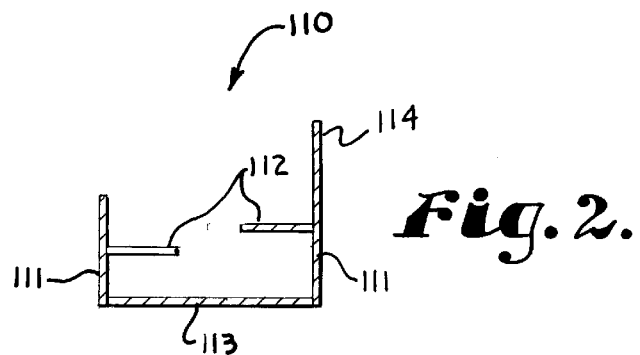
FIG. 2 is an enlarged sectional view of the gutter shown in FIG. 1 showing solids ladders in accordance with the invention.
Figure 3:
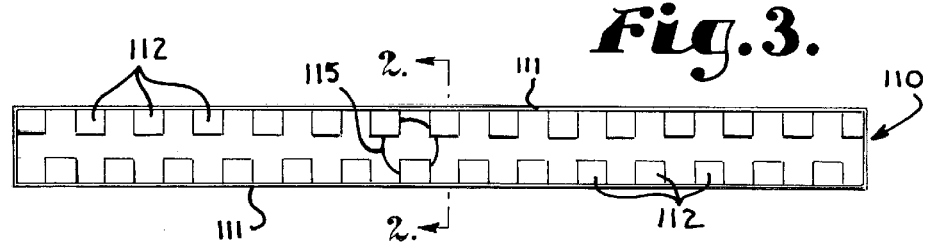
FIG. 3 is an enlarged top plan view of the gutter shown in FIG. 1.

A gutter 110, best shown in FIGS. 2 and 3 is mounted on pivots 109 below the outward-facing lower margin of each frame 104 for receiving the filter cake 31. Each gutter 110 includes a pair of sidewalls 111, a series of staggered plates or ladders 112 which extend inwardly from the sidewalls, and a bottom wall 113. One set of plates 112 may extend inwardly from each of the sidewalls 111 as depicted in FIGS. 2 and 3, or there may be multiple rows of plates 112, as depicted in FIG. 9. The plates 112 are generally flat and quadrilateral in configuration.

A first alternate embodiment of the gutter 110a depicted in FIGS. 9 and 10 includes sidewalls 111a, and a bottom wall 113a, and a series of staggered plates or ladders 112a, the centermost ladder 112a being supported from the sidewalls 111a by tubular wires 117a. A second alternate embodiment of the gutter 110b includes curved plates 112b, which extend between the sidewalls 111b. The gutters 110, 110a and 110b are constructed so that the forward sidewall 111, 111a or 111b extends upwardly to form a splash guard 114, 114a or 114b. The gutter 110, 100a or 110b may be constructed to incline toward one side of a dewatering unit 20, or it may converge toward a central aperture 115. The plates 112, 112a or 112b are evenly distributed along the sidewalls 111, 111b, across the center of the gutter 110a and vertically according to the depth of the gutter 110, 110a or 110b, so that the vertical distances between the plates 112, 112a or 112b do not exceed about 4 inches.

The filter cake 31 falls from the screen 106 onto the plates 112, 112a or 112b. Floccules 31 collect on a plate 112, 112a or 112b and act as a buffer for the fall of additional floccules 31. Once a predetermined load is reached, the accumulated cake 31 slides off the plate 112, 112a or 112b and tumbles to the next lower plate 112, 112a or 112b. In this manner, the plates 112, 112a and 112b break the fall of the filter cake 31 from the screen 106 to the bottom wall 113, 113a, or 113b so that floccule shear is minimized. Once the cake 31 reaches the bottom wall 113, 113a, or 113b, the angle of incline conveys them to the aperture 115. Either alternatively or in addition to the gutter 110, 110a or 110b, a conveyor (not shown) may be supported on the trailer 40 for carrying away the filter cake 31 after it slides off the screens 106.

The tracking screen assemblies 44 are equipped with pairs of electromechanical actuators or jackscrews 116, shown in FIG. 7 to permit adjustment of the angle of the screen assemblies 100 and 102 in accordance with the characteristics of the slurry to be dewatered. Suitable electromechanical actuators are manufactured and may be obtained from the Duff-Norton Company. An actuator 116 is coupled with each of the inward-facing side margins of each frame 104. In this manner, the angle of the screen assemblies 100 and 102 may be adjusted even during operation of the dewatering unit 20. A vibrator (not shown) may also be coupled with the tracking screen frames 104 to enhance filtration efficiency. A preferred vibrator provides parabolic vibration of the screens 106 at a rate of from about 1000 to about 3500 revolutions per minute (rpm), a rate of from about 1300 to about 2600 rpm being especially preferred.

The tracking screens 106 are of wedge-wire construction, each wire 118 having a triangular cross section with openings between the wires 118 of from about 0.3 mm to about 1.5 mm, with preferred openings of from about 0.4 mm to about 1.0 mm, and especially preferred openings of from about 0.5 mm to about 0.9 mm. The wedge wires 118 are set to subtend a preselected angle against the flow of the slurry down each screen 106 in order to assist the arrest of floccules 31 on the surface of the screen 106, with preferred angles of from about 5° to about 10°.

The dewatering unit 20, depicted in FIGS. 4, 6 and 7, presents a generally fan-shaped overall configuration including a generally vertically disposed riser 46 having a front wall 120, a back wall 122 and a pair of identical sidewalls 124. The riser 46 includes a generally rectangular, base 126, generally triangular middle portion 128, and a generally rectangular an upper portion 130. When viewed in front elevation, the base 126 is relatively narrow and the upper portion 130 is substantially wider. The base 126 has a horizontal section of relatively low aspect ratio of from about 1:1 to about 4:1, and the upper portion 130 has a horizontal section of relatively high aspect ratio of from about 40:1 to about 100:1. The ratio of the horizontal cross sectional areas of the upper portion 130 to the base 126 is from about 1:1 to about 3:1. The middle portion 128 has a generally triangular or trapezoidal front elevation, and upwardly tapering side elevation.

When viewed in front elevation, the base 126 has a relatively narrow width of about 1' 2.75" (37.5 cm), and the upper portion 130 has a relatively broad width of about 8'0" (2.44 m). When viewed in side elevation, the diffuser 46 tapers from a base 126 having a depth of about 6.5" (16.5 cm) to a narrower upper portion 130 having a depth of about 1.625" (4.1 cm). The relative dimensions of components of the diffuser 46 illustrated in FIGS. 4 and 6 are not strictly proportional to the actual dimensions The front wall 120 of the diffuser base 126 is centrally apertured for coupling with a stub pipe 132 equipped with a radially expanded flange 134, which structure collectively defines an inlet 136 for receiving a stream of flocculated slurry. In the preferred embodiment, the inlet 136 is transverse to the riser 46. Such construction imparts increased shear to the slurry, thereby keeping the floccules evenly suspended, and preventing local sedimentation. The riser 46 is preferably constructed of 10 gauge sheet metal having a thickness of about 0.05 mm. The pipe 132 is preferably constructed of carbon steel (SCH. 40) with a preferred diameter of about 10" (25.4 cm).

The upper diffuser portion 130 terminates in a rim 138 defining an elongate narrow outlet slot 139 having a pair of upstanding end risers 140 contiguous with the sides 124 of the diffuser 46. The end risers 140 project upwardly above the rim 138 for about 3" (7.6 cm) and are constructed of the same material as the diffuser 46. A weir plate assembly 141 includes pair of generally V-shaped weir plates 142 running parallel to and about 3" (7.6 cm) below the rim 138. The weir plates 142 extend downwardly for a distance of approximately 4" (10.2 cm). A generally planar spacer 144 is coupled with a respective front or back diffuser surface 120 or 122 in spaced parallel relationship to the rim 138. A generally planar wedge plate 146 is coupled with the spacer 144 in overlapping relationship. In this manner, the spacer 144 and wedge 146 cooperatively form a slot 148 for receiving and supporting one leg of the weir plate 142 in contact with a respective front or back surface 120 or 122 of the upper portion 130 of the diffuser 46. The distance of the weir plate 142 from the rim 138 may be adjusted somewhat for leveling by vertical movement of the weir plate 142 within the slot 148. The spacer 144 serves as a stop to limit the extent of downward movement of the weir plate 142.

The weir plates 142 subtend an angle of from about 30° to about 60° from the horizontal. In preferred embodiments, this angle matches that of the tracking screen assembly 44, generally about 40° to about 55°, preferably about 45° to about 50°. The weir plates 142 are preferably constructed of 10 gauge sheet metal having a thickness of about 0.05 mm, and extend the entire length of the front and back walls 120 and 122 of the riser 46.

Referring now to FIG. 8, a method for high speed dewatering of slurries in accordance with the invention includes the steps of continuously or continually measuring one or both of the flow rate 12 and the pulp density 14 of a stream of slurry, adding to the slurry a quantity of a flocculating agent which is determined in accordance with the flow rate and/or pulp density measurements and subjecting the slurry to a dewatering process 20. In more detail, slurry to be dewatered according to the system and method 10 of the invention can be obtained by dredging as described in U.S. Pat. No. 5,656,174. Those skilled in the art will appreciate that the method of the invention may be employed in conjunction with hydraulic dredge systems which employ an auger or cutterhead hydraulic dredge to remove sludge from the bottom of a waterway. Mechanical dredge systems which employ a backhoe or so-called "clam bucket" or a drag line may also be employed. Sludge may also be obtained by gravity, for example by feedlot wash down through a drain to a well or sump. The dredged material is then diluted with water from the waterway to form a slurry 22 in order to facilitate pumping to a treatment site.

The slurry 22 may be pretreated by discharging it onto a self-cleaning coarse screen (not shown) for removal of large debris. An exemplary screen is of 10–30 mesh construction with sieve openings of about 0.59–2.0 mm for removal of large debris. The underflow slurry from the coarse screen may be pumped or gravity fed over a medium vibratory screen 24, for example, of 20–100 mesh with sieve openings of about 0.149–0.84 mm, preferably of 30–80 mesh with sieve openings of about 0.177–0.59 mm for the removal of mid-sized scalp material, such as fine gravel, shale, and coarse sand. Suitable screens may be obtained from Derrick Equipment Company or Linatex Equipment Corporation.

If the slurry contains fine material with high specific gravity which will not bind to a flocculant, such as fine sand, then it is advantageous to further pretreat the slurry using a hydrocyclone 24 to remove this material. The high specific gravity material is spun to the side of the hydrocyclone bowl, and discharged through the bottom of the cone. Alternatively, the slurry may be pumped directly to a hydrocyclone 24, without prior screening.

Following pretreatment by screening and/or by hydrocyclone 24, the residual slurry should generally comprise only fine and ultra fine materials, such as clays, silts, and organic compositions which are suitable for passage into the dewatering unit 20. In order to achieve successful flocculation, the relative pulp density of the slurry should be in the range of from about 2% to about 20% by volume, and preferably from about 5% to about 10% by volume.

The slurry flow velocity and pulp density are subject to continuous or continual measurement as the stream passes from the pretreatment screen and/or hydrocyclone 24 into a mixing unit 18. A Doppler flow meter 12 is generally employed to measure the flow rate of the slurry. Among suitable devices are the Greyline PDFM-IV, available from Greyline Instruments, Inc. and the C5 ultrasonic Doppler Flow Meter available from CornpuFlow. A Coriolis tube 14 is employed to determine pulp density by measurement of the density of the slurry. Alternatively, a nuclear density meter may be used.

Readings from the flow meter 12 and pulp density measurement device 14 are electronically communicated to a programmable logic controller 16 (PLC) or control logic, which can include circuitry and software. One suitable PLC 16 is the T1 PLC, available from Toshiba. The PLC 16 is programmed with a predetermined algorithm in accordance with the characteristics of the particular slurry to be processed. The PLC 16 uses the algorithm to calculate the quantity of flocculating agent necessary for optimum flocculation of the slurry according to the appropriately scaled readings from the flow meter 12 and pulp density measurement 14.

The PLC 16 transmits a signal which actuates a positive displacement pump 28 to transfer a calculated amount of polymer flocculating agent from the polymer reservoir 30 to the slurry. A metering-type pump is preferred. Among suitable devices are the Moyno (RTM) metering pumps. The PLC 16 actuates the metering pump 28 to operate at a predetermined number of revolutions per minute and thereby to add the calculated quantity of flocculating agent in accordance with the flow rate and pulp density. In preferred embodiments, a circular "halo" type multiple-port injection stage pump (not shown) is employed to provide even addition of the flocculating agent to the slurry stream. Such even addition enhances the initial contact between polymer and solids and enhances flocculation. Those skilled in the art will appreciate that the polymer may be injected in line into the slurry stream as it passes from the shaker/hydrocyclone 24 to the mixer 18, or it may be injected into the slurry when it reaches the mixer 18.

The PLC 16 is also in electronic communication with the mixer 18, for actuation of the mixer 18 to mix the slurry whenever the positive displacement pumps 28 are engaged.

A dynamic mixer 18 is preferred. An exemplary simple mixer 18 includes a three-bladed paddle (not shown) and a rheostat for adjustable control of the mixing speed in accordance with the characteristics of the slurry to be dewatered. The mixing speed may be adjusted for efficient flocculation of the sludge slurry. If the mixing speed is too slow, the flocculating agent will be insufficiently dispersed. If the mixing speed is to fast, the forming floccules will be sheared.

A flocculating agent preferably comprises an anionic, cationic, or non-ionic polymer composition. Cationic polymers are not preferred where the recovered water filtrate is to be returned to the environment, because they can be toxic to fish. Particularly preferred flocculating agents comprise a polyacrylamide or a mixture of polyacrylamides. Use of a polymer composition in a dry state is preferred, although liquid emulsions may be employed. Dry polymers capable of rapid hydration are especially preferred. The polymers are prehydrated prior to addition by the pump 28 into the slurry stream. Use of recovered water from the dewatering process for prehydration of the dry polymer is especially preferred.

Flocculation commences upon addition of the flocculant, and continues as the stream of slurry moves from the mixer 18 to the dewatering unit 20. In a particularly preferred high speed dewatering method in accordance with the invention, the stream of slurry is divided following addition of the flocculating agent into a plurality of parallel processed streams, each delivered to a dewatering unit 20 having tracking screen assemblies 44. The number of parallel streams will depend on the desired throughput. Throughputs of up to 5000 US gal/min (0.30 $m^3s^{-1}$) can be attained using four streams.

The dewatering unit 20 may be mounted on a transportation means, such as a trailer 40 or a barge (not shown). The tracking screen assembly 44 and diffuser 46 are mounted on support frames 48, 50 and 52, which in turn are adjustably mounted on the transportation means. The actuators 86 are used to raise the unit 20 relative to the transportation means 40 from a storage position to an operating position which permits the solids to be removed from the tracking screens 106 by means of gravity. Once the unit 20 has been jacked into an operating position, the flocculated slurry stream is delivered from the mixer 18 to the diffuser 46 of the dewatering unit 20.

The previously described fan-shaped configuration of the diffuser 46 permits delivery of a stream of evenly distributed flocculated slurry onto the tracking screens 106. This results in an efficient use of the whole of the surface of each screen 106, without the clogging problems which are associated with prior art systems. Advantageously, the throughput of the system 10 is substantially enhanced. In the preferred embodiment, the inlet 136 for the stream of flocculated slurry is transverse to a delivery conduit (not shown). This imparts increased shear to the flocculated slurry, thereby keeping the floccules evenly suspended in the liquid, and preventing sedimentation within the diffuser 46. The flocculated slurry rises within the diffuser assembly from the inlet 136 and spills out through the outlet slot 139 and over the weir plates 142 onto the tracking screen assemblies 100 and 102.

The angles of the tracking screen assemblies 100 and 102 may be adjusted to a predetermined angle using the electromechanical actuators 116. The angle at which each tracking screen 106 is set preferably matches that of the diffuser weir plates 142, namely from about 30 to about 60°, preferably from about 40 to about 55°, most preferably from about 45 to about 50° from the horizontal. The angle of the tracking screens 106 may be determined in accordance with the composition of the suspended solids, so that the dewatered, flocculated material 31 will slide off the tracking screens 106 without an expression of energy which would shear the formed filter cake floccules 31. While each of the tracking screens 106 may be independently set at a different angle, it is preferred to set the tracking screens 106 at a single angle along the length of each side of a bank of assembled units 20. Preferably, a single screen section 106 is employed along each side of an A-frame 74.

The flocculated slurry is filtered by the tracking screens 106 to afford a solid filter cake 31 and a filtrate backflow. The filtered floccules 31 accumulate on the surface of a respective tracking screen 106, and then roll down the surface of the screen 106, in a snowball-type effect. The filtered floccules 31 leave the screen 106 with a consistency resembling cottage cheese. In the preferred embodiment, the riser 46 is mounted on support frames 48, 50 and 52 which are adjustably mounted on the transportation means, so that the entire diffuser 46 can be raised and articulated to permit the solids to drop off into the gutter 110, 110a or 110b and over the solids ladders 112, 112a or 112b. From the gutter 110, 110a or 110b, the solids pass downwardly onto a distribution chute or conveyor belt (not shown) for removal to a belt press 32 for the step of further dewatering. Further dewatering by the belt press 32 affords a product that is sufficiently dry to permit easy disposal. It is foreseen that the filter cake 31 may be sold as a soil product. In the event that the material in the gutter 110, 110a or 110b includes improperly flocculated material, an operator channels the flow from the gutter 110, 110a or 110b into a recycle tank.

The filtrate backflow is conveyed from the riser 46 through the drains 108 to a surge tank 34. The pulp density of the filtrate in the surge tank 34 is subject to continuous or continual measurement by the pulp density measurement device 14 and the measurements are communicated to the PLC 16. These measurements may be used alone or they may be integrated with the pulp density measurements taken from the slurry stream to calculate the quantity of flocculating agent necessary for optimum flocculation of the slurry.

The filtrate may be further clarified through any of a number of secondary treatment means 38, including settling and filtration. Settling may be achieved by means of a chevron or slant rib clarifier (not shown), or by use of a so-called frac tank (not shown). Further filtration may be accomplished using a sand filter or a carbon filter (neither shown). The clarified water can be returned to the environment, for example, to the waterway being dredged.

It is to be understood that while certain forms of the present invention have been illustrated and described herein, this is by way of example only, and is not intended to limit the scope of the invention in any way.

What is claimed and desired to be secured by Letters Patent is as follows:

1. A method of dewatering a stream of a slurry having variable flow rate and density, and comprising the steps of:
    (a) using a measuring device to continually measure a slurry characteristic of the slurry;
    (b) adding a flocculating agent in response to the measured slurry characteristic;
    (c) delivering the flocculated slurry through a diffuser onto a tracking screen, wherein said diffuser has a base with an inlet and an upper portion with a terminal outlet, the diffuser having a width diverging from said base to said outlet and a depth converging from said base to said outlet for causing even delivery of said flocculated slurry onto said screen;
    (d) filtering the flocculated slurry through the screen to afford solids and a filtrate, said tracking screen adjusted to a predetermined angle to permit dewatered flocculated material to slide off said tracking screen into a gutter;
    (e) delivering the dewatered flocculated material to the gutter; and
    (f) channeling improperly flocculated material from said gutter for recycling through the steps a–d.

2. A method according to claim 1, further including the step of:
    (c) using a programmable logic controller in communication with said measuring device to control a rate of addition of the flocculating agent in response to the measured slurry characteristic.

3. A method according to claim 1, and including the steps of:
    (a) mechanically mixing said flocculating agent with said slurry; and
    (b) controlling said mixing in response to the measured slurry characteristic.

4. A method according to claim 1, and including the step of measuring a slurry flow rate.

5. A method according to claim 4, and including the step of measuring a slurry pulp density.

6. A method according to claim 5, and including the step of measuring said slurry pulp density after addition of said flocculating agent and filtering of said slurry.

7. A method according to claim 1, wherein said gutter has at least one sidewall including structure extending inwardly and establishing a plurality of heights forming a ladder, and including the step of:
    (a) breaking a fall of said dewatered flocculated material into said gutter by contact of said dewatered flocculated material with said ladder.

8. A method according to claim 1, wherein said diffuser comprises a base having an inlet, an upper portion with a terminal outlet spaced from said inlet, said base having a horizontal section with an aspect ratio of from about 1:1 to about 4:1, said upper portion having a horizontal cross section with an aspect ratio of from about 40:1 to about 100:1, the ratio of the horizontal sectional areas at the upper portion and the base being from about 1:1 to about 3:1.

9. A method of dewatering a slurry, and comprising the steps of:
    (a) adding a flocculating agent to the slurry to generate a stream of flocculated slurry;
    (b) dewatering said stream of flocculated slurry by flowing the flocculated slurry through a diffuser onto a tracking screen, said diffuser has a base with an inlet and an upper portion with a terminal outlet, the diffuser having a width diverging from said base to said outlet and a depth converging from said base to said outlet for causing even delivery of said flocculated slurry onto said screen, to yield solids and a liquid filtrate said tracking screen adjusted to a predetermined angle to permit dewatered flocculated material to slide off said tracking screen into a gutter;
    (c) collecting the solids dewatered flocculated material in a the gutter;
    (d) continually measuring a filtrate pulp density of said filtrate;
    (e) controlling a rate of addition of the flocculating agent in quantitative relation to the measured filtrate pulp density; and (f) channeling improperly flocculated material from said gutter for recycling through the dewatering steps a–b.

10. A method according to claim 9, and including the step of:
   (a) continually measuring a flow rate of the slurry; and
   (b) controlling a rate of addition of the flocculating agent in quantitative relation to the measured filtrate pulp density and flow rate.

11. A method according to claim 9, wherein said diffuser comprises a base having an inlet, an upper portion with a terminal outlet spaced from said inlet, said base having a horizontal section with an aspect ratio of from about 1:1 to about 4:1, said upper portion having a horizontal cross section with an aspect ratio of from about 40:1 to about 100:1, the ratio of the horizontal sectional areas at the upper portion and the base being from about 1:1 to about 3:1.

12. A method according to claim 9, wherein said gutter has at least one sidewall including structure extending inwardly and establishing a plurality of heights a ladder, and including the step of:
   (a) breaking a fall of said dewatered flocculated material into said gutter by contact of said dewatered flocculated material with said ladder.

13. A method of dewatering a stream of slurry having variable flow rate and density, and comprising the steps of:
   (a) continually measuring a slurry characteristic of the slurry:
   (b) adding a flocculating agent in response to the measured slurry characteristic;
   (c) delivering the flocculated slurry through a diffuser onto a screen, said diffuser having a base with an inlet and an upper portion with a terminal outlet, the diffuser having a width diverging from said base to said outlet and a depth converging from said base to said outlet for causing even delivery of said flocculated slurry onto said screen;
   (d) said diffuser base having a horizontal section with an aspect ratio of from about 1:1 to about 4:1, said upper portion having a horizontal section with an aspect ratio of from about 40:1 to about 100:1, the ratio of the horizontal sectional areas at the upper portion and the base being from about 1:1 to about 3:1;
   (e) filtering the flocculated slurry through the screen to afford solids and a filtrate;
   (f) delivering the solids to a gutter;
   (g) said gutter having at least one sidewall including structure extending inwardly and establishing a plurality of heights forming a ladder;
   (h) breaking a fall of said solids into said gutter by contact of said solids with said ladder; and
   (i) channeling improperly flocculated solids from said gutter into a recycle tank for recycling through the steps a–e.

* * * * *

UNITED STATES PATENT AND TRADEMARK OFFICE
CERTIFICATE OF CORRECTION

PATENT NO. : 6,652,757 B2
DATED : May 3, 2004
INVENTOR(S) : Michael K. Hodges et al.

It is certified that error appears in the above-identified patent and that said Letters Patent is hereby corrected as shown below:

Column 10,
Line 60, delete the word "solids."

Signed and Sealed this

Twenty-second Day of June, 2004

JON W. DUDAS
*Acting Director of the United States Patent and Trademark Office*